United States Patent [19]
Bahl et al.

[11] Patent Number: 5,233,681
[45] Date of Patent: Aug. 3, 1993

[54] CONTEXT-DEPENDENT SPEECH RECOGNIZER USING ESTIMATED NEXT WORD CONTEXT

[75] Inventors: Lalit R. Bahl, Amawalk; Peter V. De Souza, Mahopac Falls; Ponani S. Gopalakrishnan, Croton-on-Hudson; Michael A. Picheny, White Plains, all of N.Y.

[73] Assignee: International Business Machines Corporation, Armonk, N.Y.

[21] Appl. No.: 874,271

[22] Filed: Apr. 24, 1992

[51] Int. Cl.⁵ ............................................. G10L 91/00
[52] U.S. Cl. ........................................ 395/2; 381/43; 381/41
[58] Field of Search .................. 381/41, 43, 51; 395/2

[56] References Cited

U.S. PATENT DOCUMENTS

| | | |
|---|---|---|
| 4,748,670 | 5/1988 | Bahl et al. ............................ 381/43 |
| 4,751,737 | 6/1988 | Gerson et al. ......................... 381/43 |
| 4,759,068 | 7/1988 | Rahl et al. ............................. 381/43 |
| 4,783,804 | 11/1988 | Juang et al. ........................... 381/43 |
| 4,977,599 | 12/1990 | Bohl et al. ............................. 381/43 |
| 4,980,918 | 12/1990 | Bahl et al. ............................ 381/113 |
| 5,033,087 | 7/1991 | Bahl et al. ............................. 381/43 |
| 5,054,074 | 10/1991 | Bukis .................................... 381/43 |
| 5,072,452 | 12/1991 | Brown et al. .......................... 381/43 |
| 5,129,001 | 7/1992 | Buhl et al. ............................. 381/43 |
| 5,131,043 | 7/1992 | Fujii et al. ............................. 381/43 |

OTHER PUBLICATIONS

Bahl, L. R., et al. "Context Dependent Modeling of Phones in Continuous Speech Using Decision Trees", pp. 264–269.

Bahl, L. R., et al. "A Maximum Likelihood Approach to Continuous Speech Recognition", IEEE Transactions On Pattern Analysis and Machine Intelligence, vol. PAMI-5, No. 2 Mar. 1983, V33, N9, Feb. 1991, pp. 179–190.

Bahl, L. R., "Speech Recognition Apparatus Having a Speech Coder Outputting Acoustic Prototype Ranks," U.S. Patent Application Ser. No. 781,440, filed Oct. 23, 1992.

Bahl, L. R. et al. "Apparatus and Method of Grouping Utterances of a Phoneme Into Context-Dependent Categories Based on Sound-Similarity for Automatic Speech Recognition," U.S. Pat. Application Ser. No. 468,546, filed Jan. 23, 1990.

*Primary Examiner*—Michael R. Fleming
*Assistant Examiner*—Tariq R. Hafie
*Attorney, Agent, or Firm*—Marc D. Schechter

[57] ABSTRACT

A speech recognition apparatus and method estimates the next word context for each current candidate word in a speech hypothesis. An initial model of each speech hypothesis comprises a model of a partial hypothesis of zero or more words followed by a model of a candidate word. An initial hypothesis score for each speech hypothesis comprises an estimate of the closeness of a match between the initial model of the speech hypothesis and a sequence of coded representations of the utterance. The speech hypotheses having the best initial hypothesis scores form an initial subset. For each speech hypothesis in the initial subset, the word which is most likely to follow the speech hypothesis is estimated. A revised model of each speech hypothesis in the initial subset comprises a model of the partial hypothesis followed by a revised model of the candidate word. The revised candidate word model is dependent at least on the word which is estimated to be most likely to follow the speech hypothesis. A revised hypothesis score for each speech hypothesis in the initial subset comprises an estimate of the closeness of a match between the revised model of the speech hypothesis and the sequence of coded representations of the utterance. The speech hypotheses from the initial subset which have the best revised match scores are stored as a reduced subset. At least one word of one or more of the speech hypotheses in the reduced subset is output as a speech recognition result.

31 Claims, 3 Drawing Sheets

CONTEXT-DEPENDENT SPEECH RECOGNIZER USING ESTIMATED NEXT WORD CONTEXT

BACKGROUND OF THE INVENTION

The invention relates to computer speech recognition.

In computer speech recognition, the probability of occurrence of a hypothesized string w of one or more words given the occurrence of an acoustic processor output string y may be given by $$P(w|y) = \frac{P(w)P(y|w)}{P(y)} \quad [1]$$

In Equation 1, the probability P(y|w) of the acoustic processor output string y given the utterance of hypothesized word string w, is estimated with an acoustic model of the hypothesized word string w. The probability P(w) of occurrence of the hypothesized word string w, is estimated using a language model. Since the probability P(y) of occurrence of the acoustic processor output string y, does not depend on the hypothesized word string w, the probability P(y) of occurrence of the acoustic processor output string y may be treated as a constant. The use of Equation 1 to directly decode a complete acoustic processor output string y is not feasible whenever the number of different hypothesized word strings w is very large. For example, the number of different word strings w of ten words which can be constructed from a 20,000 word vocabulary is $20{,}000^{10} = 1.024 \times 10^{43}$.

When the use of Equation 1 is not feasible, the amount of computation can be reduced by carrying out a left-to-right search starting at an initial state with single-word hypotheses, and searching successively longer word strings.

From Equation 1, the probability $P(w|y_1^i)$ of a hypothesized incomplete string w of one or more words, given the occurrence of an initial subsequence $y_1^i$ of the acoustic processor output string y may be given by:

$$P(w|y_1^i) = P(w) \sum_{i=0}^{n} P(y_1^i|w) \quad [2]$$

where $y_1^i$ represents acoustic processor outputs $y_1$ through $y_i$. However, the value of $P(w|y_1^i)$ in Equation 2 decreases with lengthening acoustic processor output subsequence $y_1^i$, making it unsuitable for comparing subsequences of different lengths. Consequently, Equation 2 can be modified with a normalization factor to account for the different lengths of the acoustic processor output subsequences during the search through incomplete subsequences:

$$\text{Match Score} = P(w) \sum_{i=0}^{n} P(y_1^i|w)\alpha^{(n-i)}E(y_{i+1}^n|y_1^i) \quad [3]$$

where $\alpha$ can be chosen by trial and error to adjust the average rate of growth of the match score along the most likely path through the model of w, and where $E(y_{i+1}^n|y_1^i)$ is an estimate of expected cost of accounting for the remainder of the acoustic processor output sequence $y_{i+1}^n$ with some continuation word string w' of the incomplete hypothesized word string w. (See, Bahl et al, "A Maximum Likelihood Approach to Continuous Speech Recognition." *IEEE Transactions on Pattern Analysis and Machine Intelligence*, Vol. PAMI-5, No. 2, March 1983, pages 179–190.)

It is known that the pronunciation of a selected word may depend on the context in which the word is uttered. That is, the pronunciation of a selected word may depend on the prior word or words uttered before the selected word, and may also depend on the subsequent word or words uttered after the selected word. Therefore, a word may have several context-dependent acoustic models, each depending on the prior word or words uttered before the selected word and the subsequent word or words uttered after the selected word. Consequently, the selection of one of several acoustic models of a word will depend on the hypothesized context in which the word is uttered.

In generating a hypothesized string w of one or more words being uttered, words are added to a partial hypothesis one word at a time in the order of time in which they are uttered. After each single word is added, but before any further words are added, the probability of the partial hypothesis is determined according to Equation 1. Only the best scoring partial hypotheses are "extended" by adding words to the ends of the partial hypotheses.

Therefore, when a new word is added to a partial hypothesis, and when the probability of the extended partial hypothesis is determined according to Equation 1, the hypothesized prior word or words are known, but the hypothesized subsequent word or words are not known. Consequently, the acoustic model selected for the new word will be independent of the context of words following the new word.

SUMMARY OF THE INVENTION

It is an object of the invention to provide a speech recognition apparatus in which, for each new word added to a partial hypothesis, at least the word following the new added word is also estimated.

It is a further object of the invention to provide a speech recognition apparatus in which, for each new word added to a partial hypothesis, the acoustic model of the new added word depends, at least in part, on an estimate of the word following the new added word.

A speech recognition apparatus according to the present invention comprises means for generating a set of two or more speech hypotheses. Each speech hypothesis comprises a partial hypothesis of zero or more words followed by a candidate word selected from a vocabulary of candidate words.

Means are also provided for storing a set of word models. Each word model represents one or more possible coded representations of an utterance of the word. The speech recognition apparatus further comprises means for generating an initial model of each speech hypothesis. Each initial model comprises a model of the partial hypothesis followed by a model of the candidate word.

The speech recognition apparatus includes an acoustic processor for generating a sequence of coded representations of an utterance to be recognized. Means are provided for generating an initial hypothesis score for each speech hypothesis. Each initial hypothesis score comprises an estimate of the closeness of a match between the initial model of the speech hypothesis and the sequence of coded representations of the utterance. Based on the initial hypothesis scores, means are provided for storing an initial subset of one or more speech hypotheses, from the set of speech hypotheses, having the best initial hypothesis scores.

For each speech hypothesis in the initial subset, next context estimating means estimate a likely word, from the vocabulary of words, which is likely to follow the speech hypothesis. Means are provided for generating a revised model of each speech hypothesis in the initial subset. Each revised model comprises a model of the partial hypothesis followed by a revised model of the candidate word. The revised candidate word model is dependent at least on the word which is estimated to be likely to follow the speech hypothesis.

Means are further provided for generating a revised hypothesis score for each speech hypothesis in the initial subset. Each revised hypothesis score comprises an estimate of the closeness of a match between the revised model of the speech hypothesis and the sequence of coded representations of the utterance. Storing means store a reduced subset of one or more speech hypotheses, from the initial subset of speech hypotheses, having the best revised match scores. Finally, output means output at least one word of one or more of the speech hypotheses in the reduced subset.

In one aspect of the invention, the revised model of each speech hypothesis in the initial subset does not include a model of the word which is estimated to be likely to follow the speech hypothesis.

In the speech recognition apparatus according to the invention, the acoustic processor may comprise means for measuring the value of at least one feature of an utterance over each of a series of successive time intervals to produce a series of feature vector signals representing the feature values. Storage means store a plurality of prototype vector signals. Each prototype vector signal has at least one parameter value and has a unique identification value.

The acoustic processor further includes means for comparing the closeness of the feature value of a first feature vector signal to the parameter values of the prototype vector signals to obtain prototype match scores for the first feature vector signal and each prototype vector signal. Ranking means associate a first-rank score with the prototype vector signal having the best prototype match score and associate a second-rank score with the prototype vector signal having the second best prototype match score. Output means output at least the identification value and the rank score of the first-rank prototype vector signal, and the identification value and the rank score of the second-ranked prototype vector signal, as a coded utterance representation signal of the first feature vector signal.

The partial hypothesis may comprise, for example, a series of words. In this case, the partial hypothesis model comprises a series of word models, where each word model represents a corresponding word in the partial hypothesis.

Each hypothesis score may comprise, for example, an estimate of the probability of occurrence of each word in the hypothesis.

The next context estimating means may, for example, further comprise means for identifying, for each speech hypothesis, a first portion of the sequence of coded representations of the utterance which is most likely to correspond to the speech hypothesis, and a second portion of the sequence of coded representations of the utterance which follows the first portion. Means are also provided for generating a next context score for each next context candidate word in the vocabulary of candidate words. Each next context score comprises an estimate of the closeness of a match between a model of the next context candidate word and the second portion of the sequence of coded representations of the utterance.

Each next context score may comprise, for example, an estimate of the probability of occurrence of the next context candidate word.

The next context estimating means may estimate, for each speech hypothesis in the initial subset, the most likely word, from the vocabulary of words, which is most likely to follow the speech hypothesis.

The means for storing hypotheses, and the means for storing word models may comprise, for example, electronic read/write memory.

The acoustic processor measuring means may comprise, in part, a microphone.

The word output means may comprise, for example, a video display such as a cathode ray tube, a liquid crystal display, or a printer. Alternatively, the word output means may comprise an audio generator having a loudspeaker or a headphone.

In a speech recognition method according to the present invention, a set of two or more speech hypotheses is generated. Each speech hypothesis comprises a partial hypothesis of zero or more words followed by a candidate word selected from a vocabulary of candidate words. A set of word models is stored. Each word model represents one or more possible coded representations of an utterance of the word. An initial model of each speech hypothesis is generated. Each initial model comprises a model of the partial hypothesis followed by a model of the candidate word.

The speech recognition method further includes the step of generating a sequence of coded representations of an utterance to be recognized. An initial hypothesis score for each speech hypothesis is generated. Each initial hypothesis score comprises an estimate of the closeness of a match between the initial model of the speech hypothesis and the sequence of coded representations of the utterance. An initial subset of one or more speech hypotheses, from the set of speech hypotheses, having the best initial hypotheses scores is stored.

For each speech hypothesis in the initial subset, a likely word, from the vocabulary of words, which is likely to follow the speech hypothesis is estimated. Thereafter, a revised model of each speech hypothesis in the initial subset is generated. Each revised model comprises a model of the partial hypothesis followed by a revised model of the candidate word. The revised candidate word model is dependent at least on the word which is estimated to be likely to follow the speech hypothesis.

A revised hypothesis score for each speech hypothesis in the initial subset is then generated. Each revised hypothesis score comprises an estimate of the closeness of a match between the revised model of the speech hypothesis and the sequence of coded representations of the utterance.

A reduced subset of one or more speech hypotheses, from the initial subset of speech hypotheses, having the best revised match scores is stored. At least one word of one or more of the speech hypotheses in the reduced subset is output.

By estimating at least the word following a new word added to a partial hypothesis, it is possible to select a context-dependent acoustic model of the new added word which depends, at least in part, on the estimate of the word following the new added word.

DESCRIPTION OF THE PREFERRED EMBODIMENTS

Figure 1:
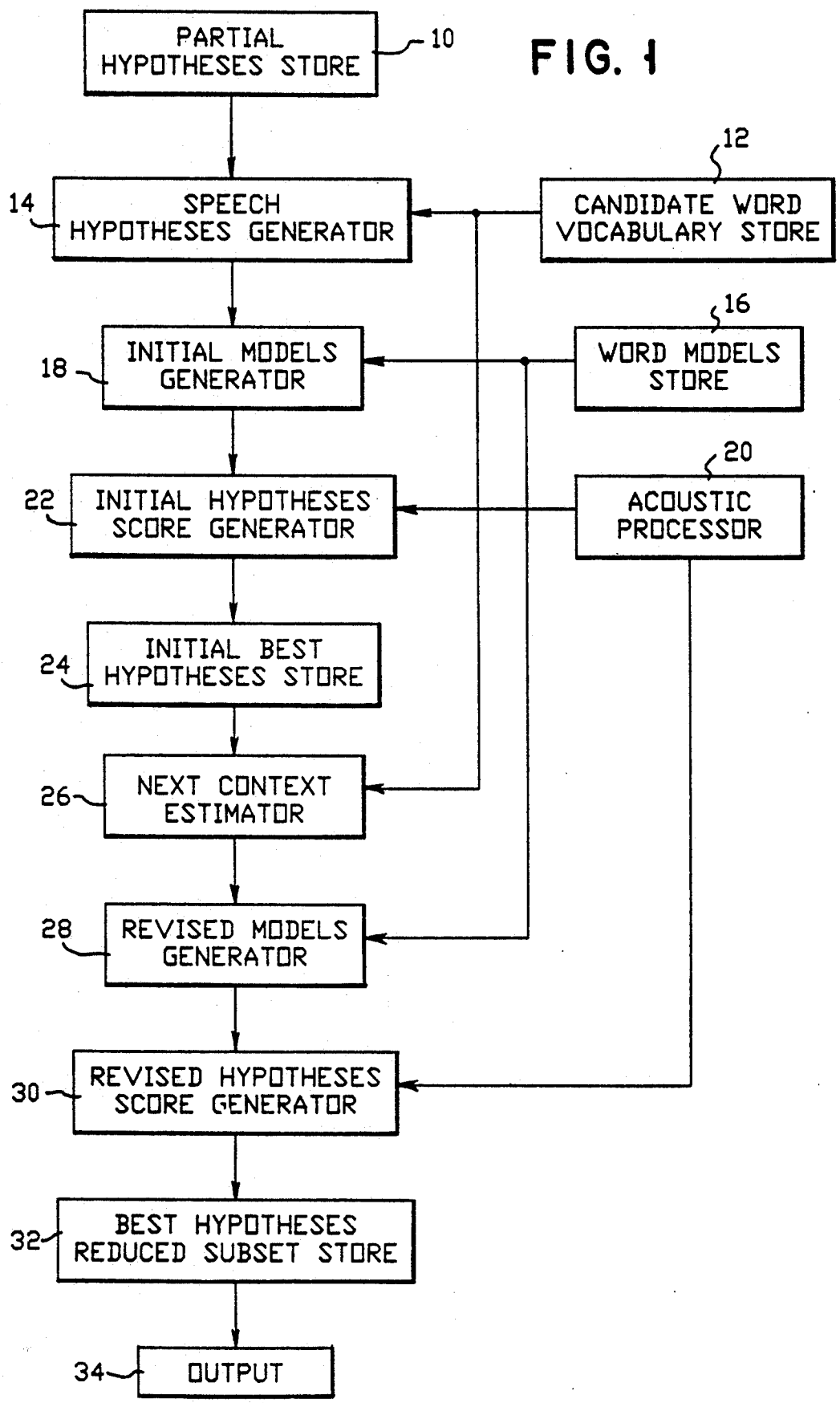
FIG. 1 is a block diagram of an example of a speech recognition apparatus according to the invention.

FIG. 1 is a block diagram of an example of a speech recognition apparatus according to the present invention. The speech recognition apparatus includes a partial hypotheses store 10 and a candidate word vocabulary store 12. A speech hypotheses generator 14 generates a set of two or more speech hypotheses. Each speech hypothesis comprises a partial hypothesis of zero or more words from partial hypothesis store 10 followed by a candidate word selected from candidate word vocabulary store 12. Table 1 shows an example of artificial partial hypotheses. These partial hypotheses may be, for example, the best scoring partial hypotheses which have been found thus far by the speech recognition apparatus.

TABLE 1

| Partial Hypotheses |
| --- |
| We the people |
| We the pebble |
| We the Pueblo |
| We the peep hole |
| We thy people |
| We thy pebble |
| We thy Pueblo |
| We thy peep hole |
| Weave the people |

The candidate word vocabulary store 12 contains all of the words for which the speech recognition apparatus stores an acoustic word model.

Table 2 shows an example of artificial speech hypotheses comprising the partial hypotheses of Table 1 followed by the candidate words "of", "off", and "love". In practice, every word in the candidate word vocabulary store 20 will be appended to each partial hypothesis to produce a speech hypothesis. Therefore, if there are nine partial hypotheses, and if there are 20,000 candidate words, then 180,000 new speech hypotheses will be produced. If there are no partial hypotheses, then 20,000 single-word hypotheses will be produced.

TABLE 2

| Speech Hypotheses |
| --- |
| We the people of |
| We the pebble of |
| We the Pueblo of |
| We the peep hole of |
| We thy people of |
| We thy pebble of |
| We thy Pueblo of |
| We thy peep hole of |
| Weave the people of |
| We the people off |
| We the pebble off |
| We the Pueblo off |
| We the peep hole off |
| We thy people off |

TABLE 2-continued

| Speech Hypotheses |
| --- |
| We thy pebble off |
| We thy Pueblo off |
| We thy peep hole off |
| Weave the people |
| We the people love |
| We the pebble love |
| We the Pueblo love |
| We the peep hole love |
| We thy people love |
| We thy pebble love |
| We thy Pueblo love |
| We thy peep hole love |
| Weave the people love |

The speech recognition apparatus of FIG. 1 further includes a word models store 16 for storing a set of word models. Each word model represents one or more possible coded representations of an utterance of a word. Word models store 16 stores word models of the words in the candidate word vocabulary store 12.

The word models in store 16 may be, for example, Markov models or other dynamic programming type models. The models may be context-independent or context-dependent. The models may, for example, be built up from submodels of phonemes.

Context-independent Markov models may be produced, for example, by the method described in U.S. Pat. No. 4,759,068 entitled "Constructing Markov Models of Words From Multiple Utterances," or by any other known method of generating word models.

For context-dependent word models, the context can be, for example, manually or automatically selected. One method of automatically selecting context is described in U.S. patent application Ser. No. 468,546 filed Jan. 23, 1990, entitled "Apparatus And Method of Grouping Utterances of a Phoneme Into Context-Dependent Categories Based on Sound-Similarity for Automatic Speech Recognition."

The speech recognition apparatus further comprises an initial models generator 18 for generating an initial model of each speech hypothesis. Each initial model comprises a model of the partial hypothesis followed by a model of the candidate word. Table 3 shows an example of an artificial initial model of each speech hypothesis from Table 2. Each model $M_i$ may be, for example, a Markov model whose parameters depend upon the word being modelled.

TABLE 3

| Speech Hypotheses | Initial Model | | | | |
| --- | --- | --- | --- | --- | --- |
| We the people of | M1 | M2 | M3 | M4 | |
| We the pebble of | M1 | M2 | M5 | M4 | |
| We the Pueblo of | M1 | M2 | M6 | M4 | |
| We the peep hole of | M1 | M2 | M7 | M8 | M4 |
| We thy people of | M1 | M9 | M3 | M4 | |
| We thy pebble of | M1 | M9 | M5 | M4 | |
| We thy Pueblo of | M1 | M9 | M6 | M4 | |
| We thy peep hole of | M1 | M9 | M7 | M8 | M4 |
| Weave the people of | M10 | M2 | M3 | M4 | |
| We the people off | M1 | M2 | M3 | M11 | |
| We the pebble off | M1 | M2 | M5 | M11 | |
| We the Pueblo off | M1 | M2 | M6 | M11 | |
| We the peep hole off | M1 | M2 | M7 | M8 | M11 |
| We thy people off | M1 | M9 | M3 | M11 | |
| We thy pebble off | M1 | M9 | M5 | M11 | |
| We thy Pueblo off | M1 | M9 | M6 | M11 | |
| We thy peep hole off | M1 | M9 | M7 | M8 | M11 |
| Weave the peole off | M10 | M2 | M3 | M11 | |
| we the people love | M1 | M2 | M3 | M12 | |
| We the pebble love | M1 | M2 | M5 | M12 | |
| We the Pueblo love | M1 | M2 | M6 | M12 | |

TABLE 3-continued

| Speech Hypotheses | Initial Model | | | | |
|---|---|---|---|---|---|
| We the peep hole love | M1 | M2 | M7 | M8 | M12 |
| We thy people love | M1 | M9 | M3 | M12 | |
| We thy pebble love | M1 | M9 | M5 | M12 | |
| We thy Pueblo love | M1 | M9 | M6 | M12 | |
| We thy peep hole love | M1 | M9 | M7 | M8 | M12 |
| Weave the people love | M10 | M2 | M3 | M12 | |

As shown in Table 3, each partial hypothesis comprises a series of words. Each partial hypothesis model comprises a series of word models. Each word model represents a corresponding word in the partial hypothesis, as shown in Table 4. Each initial model in Table 3 comprises a model of the partial hypothesis followed by a model of the candidate word. (See Table 4.)

TABLE 4

| Word | Word Model |
|---|---|
| We | M1 |
| the | M2 |
| people | M3 |
| of | M4 |
| pebble | M5 |
| Pueblo | M6 |
| peep | M7 |
| hole | M8 |
| thy | M9 |
| Weave | M10 |
| off | M11 |
| love | M12 |

Returning to FIG. 1, the speech recognition apparatus according to the invention further includes an acoustic processor 20. As described in further detail below, the acoustic processor generates a sequence of coded representations of an utterance to be recognized.

An initial hypothesis score generator 22 generates an initial hypothesis score for each speech hypothesis. Each initial hypothesis score comprises an estimate of the closeness of a match between the initial model of the speech hypothesis from initial models generator 18 and the sequence of coded representations of the utterance from acoustic processor 20. Preferably, the initial hypothesis score is obtained according to Equation 3, above. Preferably the summation of Equation 3 is calculated only over those acoustic processor output subsequences for which the value $P(y_1^i|w) \alpha^{(n-i)} E(y_{i+1}^n|y_1^i)$ is within a selected range of the maximum value thereof.

An initial best hypotheses store 24 stores an initial subset of one or more speech hypotheses, from the set of speech hypotheses, having the best initial hypothesis scores.

The initial subset of speech hypotheses having the best initial hypothesis scores can be selected as those speech hypotheses which meet all of the following criteria. The best speech hypotheses should have one of the best N scores (where N is a selected positive integer). The score of any individual "best" hypothesis divided by the score of the best "best" speech hypothesis should be greater than a selected ratio M. Finally, the absolute value of the score of each best speech hypothesis should be better than a selected threshold L. Typically, N may be 300-400. The ratio M may be $10^{-6}$. The threshold L will depend on how scores are calculated.

Table 5 shows an artificial example of an initial subset of nine speech hypotheses, from the set of speech hypotheses of Table 2, having the best initial hypothesis scores.

TABLE 5

| Initial Subset of Speech Hypotheses |
|---|
| We the people of |
| We thy people of |
| Weave the people of |
| We the people off |
| We thy people off |
| Weave the people off |
| We the people love |
| We thy people love |
| Weave the people love |

Next context estimator 26 estimates, for each speech hypothesis in the initial subset stored in initial best hypotheses store 24, a likely word from the vocabulary of words, which is likely to follow the speech hypothesis.

For this purpose, the next context estimating means further comprises means for identifying, for each speech hypothesis, a first portion of the sequence of coded representations of the utterance which is most likely to correspond to the speech hypothesis, and a second portion of the sequence of coded representations of the utterance which follows the first portion. The next context estimating means also includes means for generating a next context score for each next context candidate word in the vocabulary of candidate words. Each next context score comprises an estimate of the closeness of a match between a model of the next context candidate word and the second portion of the sequence of coded representations of the utterance.

For each speech hypothesis, the first portion of the sequence of coded representations of the utterance is preferably the acoustic processor output subsequence $y_1^i$ for which the value $P(y_1^i|w) \alpha^{n-i} E(y_{i+1}^n|y_1^i)$ of Equation 3 is maximum. The next context score can be obtained according to Equation 3 for the second portion $y_{i+1}^n$ of the sequence of coded representations of the utterances.

The speech recognition apparatus further comprises a revised models generator 28 for generating a revised model of each speech hypothesis in the initial subset. Each revised model comprises a model of the partial hypothesis followed by a revised model of the candidate word. The revised candidate word model is dependent at least on the word which is estimated to be likely to follow the speech hypothesis.

Table 6 shows an artificial example of the likely next word context for each of the speech hypotheses in the initial subset of speech hypotheses of Table 5.

TABLE 6

| Initial Subset of Speech Hypotheses | Most Likely Next Context |
|---|---|
| We the people of | the |
| We thy people of | the |
| Weave the people of | thy |
| We the people off | thy |
| We thy people off | the |
| Weave the people off | the |
| We the people love | the |
| We thy people love | thy |
| Weave the people love | the |

Table 7 shows an artificial example of revised word models for each candidate word in the initial subset of speech hypotheses.

TABLE 7

| Word | Next Context | Revised Word Model |
|---|---|---|
| of | the | M4' |
| off | the | M11' |
| love | the | M12' |
| of | thy | M4" |
| off | thy | M11" |
| love | thy | M12" |

Table 8 shows an artificial example of the speech hypotheses in the initial subset with their corresponding revised models. Each revised model of a speech hypothesis comprises a model of the partial hypothesis followed by a revised model of the candidate word.

TABLE 8

| Initial Subset of Speech Hypotheses | Revised Model | | | |
|---|---|---|---|---|
| We the people of | M1 | M2 | M3 | M4' |
| We thy people of | M1 | M9 | M3 | M4' |
| Weave the people of | M10 | M2 | M3 | M4" |
| We the people off | M1 | M2 | M3 | M11" |
| We thy people off | M1 | M9 | M3 | M11' |
| Weave the people off | M10 | M2 | M3 | M11' |
| We the people love | M1 | M2 | M3 | M12' |
| We thy people love | M1 | M9 | M3 | M12" |
| Weave the people love | M10 | M2 | M3 | M12' |

The revised model of each speech hypothesis does not include a model of the word which is estimated to be likely to follow the candidate word of the speech hypothesis.

Each revised candidate word model is dependent at least on the word which is estimated to be likely to follow the speech hypothesis. As discussed above, context-dependent models can be obtained by any known manual or automatic method of model generation.

A revised hypothesis score generator 30 generates a revised hypothesis score for each speech hypothesis in the initial subset. Each revised hypothesis score comprises an estimate of the closeness of a match between the revised model of the speech hypothesis and the sequence of coded representations of the utterance.

The revised hypothesis score can be generated in the same manner as the initial hypothesis score, but using the revised hypothesis model.

Best hypotheses reduced subset store 32 stores a reduced subset of one or more speech hypotheses, from the initial subset of speech hypotheses, having the best revised match scores.

Table 9 shows a hypothetical example of a reduced subset of speech hypotheses, from the initial subset of speech hypotheses of Table 5, having the best revised match scores.

TABLE 9

| Reduced Subset of Speech Hypotheses |
|---|
| We the people of |
| We thy people of |
| We the people off |
| We thy people off |
| We the people love |
| We thy people love |

Output means 34 outputs at least one word of one or more of the speech hypotheses in the reduced subset. As shown in Table 9, the first word of each speech hypothesis in the reduced subset is "We". Since there are no other hypotheses for the first word, the word "We" will be output.

If the output is a video display, such as a cathode ray tube, a liquid crystal display, or a printer, the word "We" will be displayed. If the output is an audio generator having, for example, a loudspeaker, or a headphone, the word "We" will be synthesized.

After the word "We" is output, the reduced subset of speech hypotheses of Table 9 may be treated as a new set of partial speech hypotheses. These partial hypotheses are then used in generating a new set of extended speech hypotheses, each of which will include a new candidate for the next word of the utterance.

In each initial model of an extended speech hypothesis, the model of the previous candidate word (the word "of", "off", or "love" in the example of Table 9) is preferably a second revised model which is dependent, in part, on the new candidate for the last word of the extended speech hypothesis (that is, the new candidate for the next word of the utterance).

The partial hypotheses store 10, the candidate word vocabulary store 12, the word models store 16, the initial best hypotheses store 24, and the best hypotheses reduced subset store 32 may comprise, for example, electronic read/write memory, such as static or dynamic random access memory, read only memory, and/or magnetic disk memory. The speech hypotheses generator 14, the initial models generator 18, the initial hypotheses score generator 22, the next context estimator 26, the revised models generator 28, and the revised hypotheses score generator 30 may be formed by suitably programming a general or special purpose digital computer.

As discussed above, the initial hypothesis score generator 22 generates an initial hypothesis score for each speech hypothesis. Each initial hypothesis score comprises an estimate of the closeness of a match between the initial model of the speech hypothesis and the sequence of coded representations of the utterance. In one example, the initial hypothesis score may be a weighted combination of an acoustic match score and a language model match score for each word in the hypothesis. The language model match score for a word is an estimate of the probability P(w) of occurrence of the word in Equations 1-3, above.

Similarly, the next context score for each next context candidate word may be a weighted combination of an acoustic match score and a language model score. The weighting factor can be chosen so that the next context score may be solely an acoustic match score, or alternatively may be solely a language model score. In the latter case, the computational requirements are significantly reduced.

The next context estimating means may estimate, for each speech hypothesis in the initial subset, the most likely word, from the vocabulary of words, which is most likely to follow the speech hypothesis.

If the next context score is solely a language model score, and if the language model is a 1-gram model, then the estimated word which is most likely to follow the speech hypothesis will be a constant for all speech hypotheses.

Figure 2:
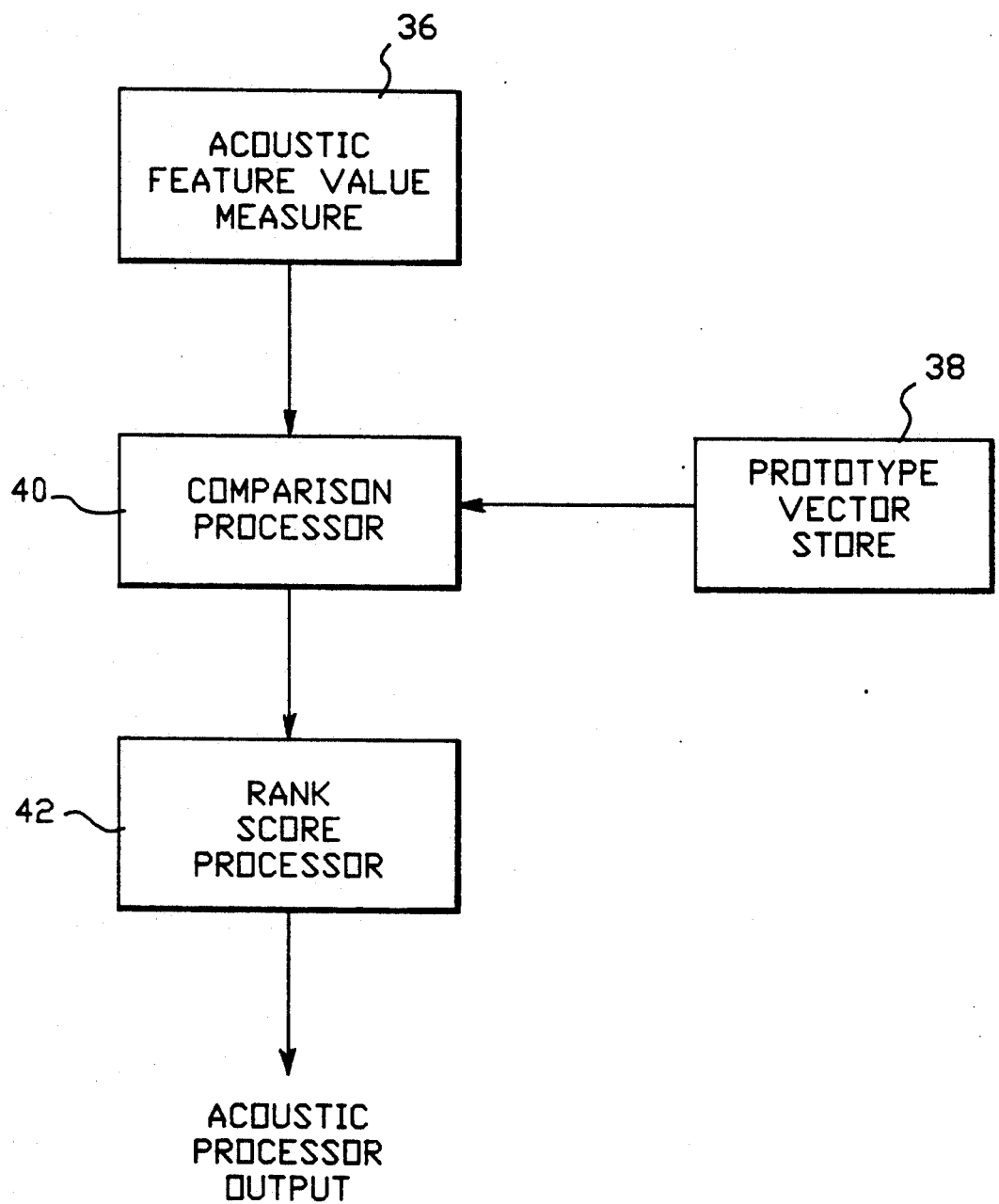
FIG. 2 is a block diagram of an example of an acoustic processor for a speech recognition apparatus according to the invention.

FIG. 2 is a block diagram of an example of an acoustic processor 20 (FIG. 1) for a speech recognition apparatus according to the present invention. An acoustic feature value measure 36 is provided for measuring the value of at least one feature of an utterance over each of a series of successive time intervals to produce a series of feature vector signals representing the feature values. Table 10 illustrates a hypothetical series of one-dimension feature vector signals corresponding to time intervals t1, t2, t3, t4, and t5, respectively.

TABLE 10

| time | t1 | t2 | t3 | t4 | t5 |
|---|---|---|---|---|---|
| Feature Value | 0.18 | 0.52 | 0.96 | 0.61 | 0.84 |

A prototype vector store 38 stores a plurality of prototype vector signals. Each prototype vector signal has at least one parameter value and has a unique identification value.

Table 11 shows a hypothetical example of five prototype vectors signals having one parameter value each, and having identification values P1, P2, P3, P4, and P5, respectively.

TABLE 11

| Prototype Vector | | | | | |
|---|---|---|---|---|---|
| Identification Value | P1 | P2 | P3 | P4 | P5 |
| Parameter Value | 0.45 | 0.59 | 0.93 | 0.76 | 0.21 |

A comparison processor 40 compares the closeness of the feature value of each feature vector signal to the parameter values of the prototype vector signals to obtain prototype match scores for each feature vector signal and each prototype vector signal. Table 12 illustrates a hypothetical example of prototype match scores for the feature vector signals of Table 10, and the prototype vector signals of Table 11.

TABLE 12

| | Prototype Vector Match Scores | | | | |
|---|---|---|---|---|---|
| time | t1 | t2 | t3 | t4 | t5 |
| Prototype Vector Identification Value | | | | | |
| P1 | 0.27 | 0.07 | 0.51 | 0.16 | 0.39 |
| P2 | 0.41 | 0.07 | 0.37 | 0.02 | 0.25 |
| P3 | 0.75 | 0.41 | 0.03 | 0.32 | 0.09 |
| P4 | 0.58 | 0.24 | 0.2 | 0.15 | 0.08 |
| P5 | 0.03 | 0.31 | 0.75 | 0.4 | 0.63 |

In the hypothetical example, the feature vector signals and the prototype vector signal are shown as having one dimension only, with only one parameter value for that dimension. In practice, however, the feature vector signals and prototype vector signals may have, for example, fifty dimensions, where each dimension has two parameter values. The two parameter values of each dimension may be, for example, a mean value and a standard deviation (or variance) value.

Still referring to FIG. 2, the speech recognition and speech coding apparatus further comprise a rank score processor 42 for associating, for each feature vector signal, a first-rank score with the prototype vector signal having the best prototype match score, and a second-rank score with the prototype vector signal having the second best prototype match score.

Preferably, the rank score processor 42 associates a rank score with all prototype vector signals for each feature vector signal. Each rank score represents the estimated closeness of the associated prototype vector signal to the feature vector signal relative to the estimated closeness of all other prototype vector signals to the feature vector signal. More specifically, the rank score for a selected prototype vector signal for a given feature vector signal is monotonically related to the number of other prototype vector signals having prototype match scores better than the prototype match score of the selected prototype vector signal for the given feature vector signal.

Table 13 shows a hypothetical example of prototype vector rank scores obtained from the prototype match scores of Table 12.

TABLE 13

| | Prototype Vector Rank Scores | | | | |
|---|---|---|---|---|---|
| time | t1 | t2 | t3 | t4 | t5 |
| Prototype Vector Identification Value | | | | | |
| P1 | 2 | 1 | 4 | 3 | 4 |
| P2 | 3 | 1 | 3 | 1 | 3 |
| P3 | 5 | 5 | 1 | 4 | 2 |
| P4 | 4 | 3 | 2 | 2 | 1 |
| P5 | 1 | 4 | 5 | 5 | 5 |

As shown in Tables 12 and 13, the prototype vector signal P5 has the best (in this case the closest) prototype match score with the feature vector signal at time t1 and is therefore associated with the first-rank score of "1". The prototype vector signal P1 has the second best prototype match score with the feature vector signal at time t1, and therefore is associated with the second-rank score of "2". Similarly, for the feature vector signal at time t1, prototype vector signals P2, P4, and P3 are ranked "3", "4" and "5" respectively. Thus, each rank score represents the estimated closeness of the associated prototype vector signal to the feature vector signal relative to the estimated closeness of all other prototype vector signals to the feature vector signal.

Alternatively, as shown in Table 14, it is sufficient that the rank score for a selected prototype vector signal for a given feature vector signal is monotonically related to the number of other prototype vector signals having prototype match scores better than the prototype match score of the selected prototype vector signal for the given feature vector signal. Thus, for example, prototype vector signals P5, P1, P2, P4, and P3 could have been assigned rank scores of "1", "2", "3", "3" and "3", respectively. In other words, the prototype vector signals can be ranked either individually, or in groups.

TABLE 14

| | Prototype Vector Rank Scores (alternative) | | | | |
|---|---|---|---|---|---|
| time | t1 | t2 | t3 | t4 | t5 |
| Prototype Vector Identification Value | | | | | |
| P1 | 2 | 1 | 3 | 3 | 3 |
| P2 | 3 | 1 | 3 | 1 | 3 |
| P3 | 3 | 3 | 1 | 3 | 2 |
| P4 | 3 | 3 | 2 | 2 | 1 |
| P5 | 1 | 3 | 3 | 3 | 3 |

In addition to producing the rank scores, rank score processor 16 outputs, for each feature vector signal, at least the identification value and the rank score of the first-ranked prototype vector signal, and the identification value and the rank score of the second-ranked prototype vector signal, as a coded utterance representation signal of the feature vector signal, to produce a series of coded utterance representation signals.

Figure 3:
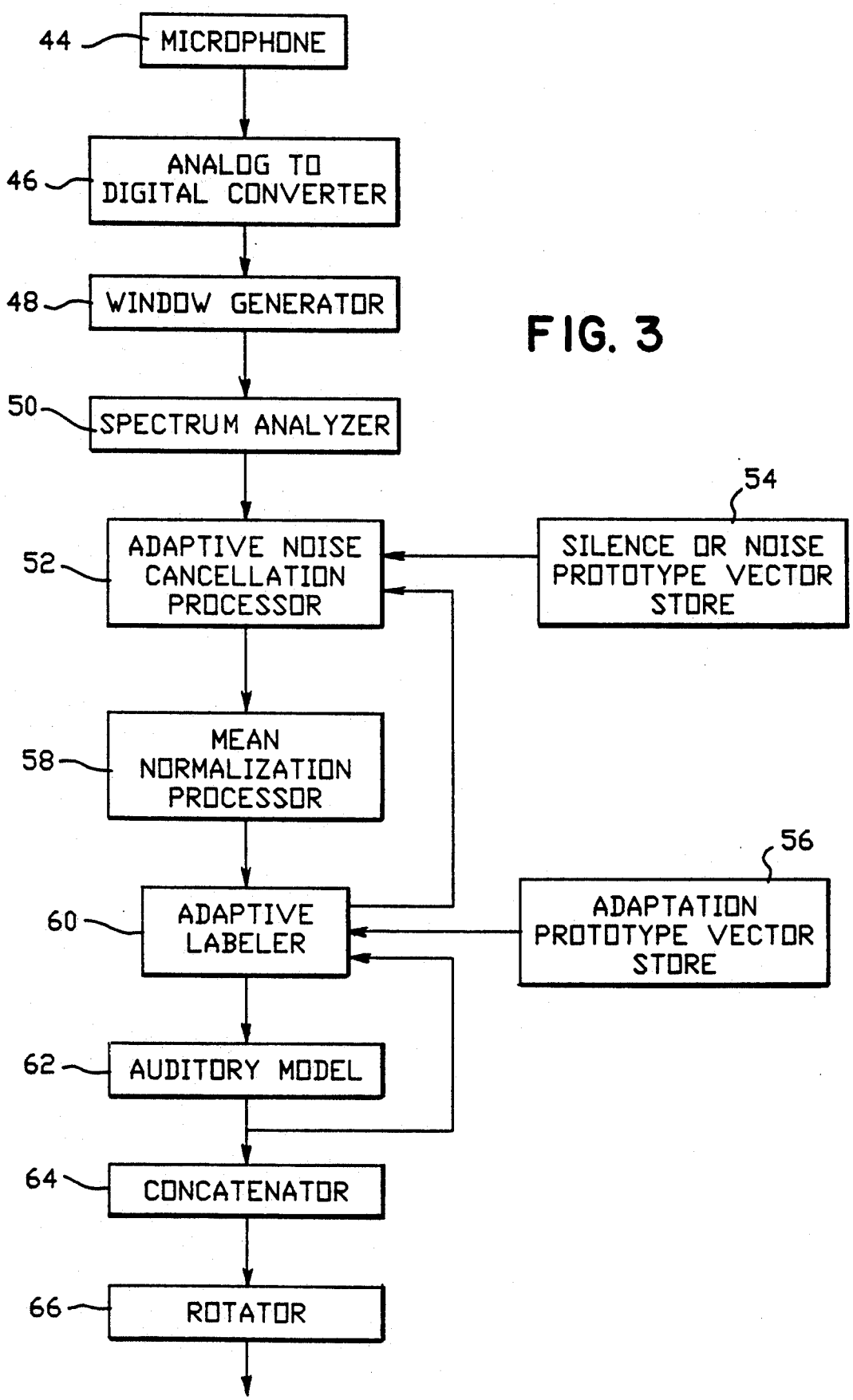
FIG. 3 is a block diagram of an example of an acoustic feature value measure for the acoustic processor of FIG. 2.

One example of an acoustic feature value measure is shown in FIG. 3. The measuring means includes a microphone 44 for generating an analog electrical signal corresponding to the utterance. The analog electrical signal from microphone 44 is converted to a digital electrical signal by analog to digital converter 46. For this purpose, the analog signal may be sampled, for example, at a rate of twenty kilohertz by the analog to digital converter 46.

A window generator 48 obtains, for example, a twenty millisecond duration sample of the digital signal from analog to digital converter 46 every ten milliseconds (one centisecond). Each twenty millisecond sample of the digital signal is analyzed by spectrum analyzer 50 in order to obtain the amplitude of the digital signal sample in each of, for example, twenty frequency bands. Preferably, spectrum analyzer 50 also generates a twenty-first dimension signal representing the total amplitude or total power of the twenty millisecond digital signal sample. The spectrum analyzer 50 may be, for example, a fast Fourier transform processor. Alternatively, it may be a bank of twenty band pass filters.

The twenty-one dimension vector signals produced by spectrum analyzer 50 may be adapted to remove background noise by an adaptive noise cancellation processor 52. Noise cancellation processor 52 subtracts a noise vector N(t) from the feature vector F(t) input into the noise cancellation processor to produce an output feature vector F'(t). The noise cancellation processor 52 adapts to changing noise levels by periodically updating the noise vector N(t) whenever the prior feature vector F(t−1) is identified as noise or silence. The noise vector N(t) is updated according to the formula $$N(t) = \frac{N(t-1) + k[F(t-1) - Fp(t-1)]}{(1+k)}, \quad [4]$$

where N(t) is the noise vector at time t, N(t−1) is the noise vector at time (t−1), k is a fixed parameter of the adaptive noise cancellation model, F(t−1) is the feature vector input into the noise cancellation processor 52 at time (t−1) and which represents noise or silence, and Fp(t−1) is one silence or noise prototype vector, from store 54, closest to feature vector F(t−1).

The prior feature vector F(t−1) is recognized as noise or silence if either (a) the total energy of the vector is below a threshold, or (b) the closest prototype vector in adaptation prototype vector store 56 to the feature vector is a prototype representing noise or silence. For the purpose of the analysis of the total energy of the feature vector, the threshold may be, for example, the fifth percentile of all feature vectors (corresponding to both speech and silence) produced in the two seconds prior to the feature vector being evaluated.

After noise cancellation, the feature vector F'(t) is normalized to adjust for variations in the loudness of the input speech by short term mean normalization processor 58. Normalization processor 58 normalizes the twenty-one dimension feature vector F'(t) to produce a twenty dimension normalized feature vector X(t). The twenty-first dimension of the feature vector F'(t), representing the total amplitude or total power, is discarded. Each component i of the normalized feature vector X(t) at time t may, for example, be given by the equation $$X_i(t) = F'_i(t) - Z(t) \quad [5]$$

in the logarithmic domain, where $F'_i(t)$ is the i-th component of the unnormalized vector at time t, and where Z(t) is a weighted mean of the components of F'(t) and Z(t−1) according to Equations 6 and 7:

$$Z(t) = 0.9Z(t-1) + 0.1M(t) \quad [6]$$

and where $$M(t) = \frac{1}{20} \sum_i F'_i(t) \quad [7]$$

The normalized twenty dimension feature vector X(t) may be further processed by an adaptive labeler 60 to adapt to variations in pronunciation of speech sounds. An adapted twenty dimension feature vector X'(t) is generated by subtracting a twenty dimension adaptation vector A(t) from the twenty dimension feature vector X(t) provided to the input of the adaptive labeler 60. The adaptation vector A(t) at time t may, for example, be given by the formula $$A(t) = \frac{A(t-1) + k[X(t-1) - Xp(t-1)]}{(1+k)}, \quad [8]$$

where k is a fixed parameter of the adaptive labeling model, X(t−1) is the normalized twenty dimension vector input to the adaptive labeler 60 at time (t−1), Xp(t−1) is the adaptation prototype vector (from adaptation prototype store 56) closest to the twenty dimension feature vector X(t−1) at time (t−1), and A(t−1) is the adaptation vector at time (t−1).

The twenty dimension adapted feature vector signal X'(t) from the adaptive labeler 60 is preferably provided to an auditory model 62. Auditory model 62 may, for example, provide a model of how the human auditory system perceives sound signals. An example of an auditory model is described in U.S. Pat. No. 4,980,918 to Bahl et al entitled "Speech Recognition System with Efficient Storage and Rapid Assembly of Phonological Graphs".

Preferably, according to the present invention, for each frequency band i of the adapted feature vector signal X'(t) at time t, the auditory model 62 calculates a new parameter $E_i(t)$ according to Equations 9 and 10:

$$E_i(t) = K_1 + K_2(X'_i(t))(N_i(t-1)) \quad [9]$$

where $$N_i(t) = K_3 \times N_i(t-1) - E_i(t-1) \quad [10]$$

and where $K_1$, $K_2$, and $K_3$ are fixed parameters of the auditory model.

For each centisecond time interval, the output of the auditory model 62 is a modified twenty dimension feature vector signal. This feature vector is augmented by a twenty-first dimension having a value equal to the square root of the sum of the squares of the values of the other twenty dimensions.

For each centisecond time interval, a concatenator 64 preferably concatenates nine twenty-one dimension feature vectors representing the one current centisecond time interval, the four preceding centisecond time intervals, and the four following centisecond time intervals to form a single spliced vector of 189 dimensions. Each 189 dimension spliced vector is preferably multiplied in a rotator 66 by a rotation matrix to rotate the spliced vector and to reduce the spliced vector to fifty dimensions.

The rotation matrix used in rotator 66 may be obtained, for example, by classifying into M classes a set of 189 dimension spliced vectors obtained during a training session. The covariance matrix for all of the spliced vectors in the training set is multiplied by the inverse of the sample within-class covariance matrix for all of the spliced vectors in all M classes. The first fifty eigenvectors of the resulting matrix form the rotation matrix. (See, for example, "Vector Quantization Procedure For Speech Recognition Systems Using Discrete Parameter Phoneme-Based Markov Word Models" by L. R. Bahl, et al, *IBM Technical Disclosure Bulletin*, Volume 32, No. 7, December 1989, pages 320 and 321.)

Window generator 48, spectrum analyzer 50, adaptive noise cancellation processor 52, short term mean normalization processor 58, adaptive labeler 60, auditory model 62, concatenator 64, and rotator 66, may be suitably programmed special purpose or general purpose digital signal processors. Prototype stores 54 and 56 may be electronic computer memory of the types discussed above.

The prototype vectors in prototype store 38 may be obtained, for example, by clustering feature vector signals from a training set into a plurality of clusters, and then calculating the mean and standard deviation for each cluster to form the parameter values of the prototype vector. When the training script comprises a series of word-segment models (forming a model of a series of words), and each word-segment model comprises a series of elementary models having specified locations in the word-segment models, the feature vector signals may be clustered by specifying that each cluster corresponds to a single elementary model in a single location in a single word-segment model. Such a method is described in more detail in U.S. patent application Ser. No. 730,714, filed on Jul. 16, 1991, entitled "Fast Algorithm for Deriving Acoustic Prototypes for Automatic Speech Recognition."

Alternatively, all acoustic feature vectors generated by the utterance of a training text and which correspond to a given elementary model may be clustered by K-means Euclidean clustering or K-means Gaussian clustering, or both. Such a method is described, for example, in U.S. patent application Ser. No. 673,810, filed on Mar. 22, 1991 entitled "Speaker-Independent Label Coding Apparatus".

We claim:

1. A speech recognition apparatus comprising:

means for generating a set of two or more speech hypotheses, each speech hypothesis comprising a partial hypothesis of zero or more words followed by a candidate word selected from a vocabulary of candidate words;

means for storing a set of word models, each word model representing one or more possible coded representations of an utterance of a word;

means for generating an initial model of each speech hypothesis, each initial model comprising a model of the partial hypothesis followed by a model of the candidate word;

an acoustic processor for generating a sequence of coded representations of an utterance to be recognized;

means for generating an initial hypothesis score for each speech hypothesis, each initial hypothesis score comprising an estimate of the closeness of a match between the initial model of the speech hypothesis and the sequence of coded representations of the utterance;

means for storing an initial subset of one or more speech hypotheses, from the set of speech hypotheses, having the best initial hypothesis scores;

next context estimating means for estimating, for each speech hypothesis in the initial subset, a likely word, from the vocabulary of words, which is likely to follow the speech hypothesis;

means for generating a revised model of each speech hypothesis in the initial subset, each revised model comprising a model of the partial hypothesis followed by a revised model of the candidate word, the revised candidate word model being dependent at least on the word which is estimated to be likely to follow the speech hypothesis;

means for generating a revised hypothesis score for each speech hypothesis in the initial subset, each revised hypothesis score comprising an estimate of the closeness of a match between the revised model of the speech hypothesis and the sequence of coded representations of the utterance;

means for storing a reduced subset of one or more speech hypotheses, from the initial subset of speech hypotheses, having the best revised match scores; and means for outputting at least one word of one or more of the speech hypotheses in the reduced subset.

2. A speech recognition apparatus as claimed in claim 1, characterized in that the revised model of each speech hypothesis in the initial subset does not include a model of the word which is estimated to be likely to follow the speech hypothesis.

3. A speech recognition apparatus as claimed in claim 2, characterized in that the acoustic processor comprises:

means for measuring the value of at least one feature of an utterance over each of a series of successive time intervals to produce a series of feature vector signals representing the feature values;

means for storing a plurality of prototype vector signals, each prototype vector signal having at least one parameter value and having a unique identification value;

means for comparing the closeness of the feature value of a first feature vector signal to the parameter values of the prototype vector signals to obtain prototype match scores for the first feature vector signal and each prototype vector signal;

ranking means for associating a first-rank score with the prototype vector signal having the best prototype match score, and for associating a second-rank score with the prototype vector signal having the second best prototype match score; and means for outputting at least the identification value and the rank score of the first-ranked prototype vector signal, and the identification value and the rank score of the second-ranked prototype vector signal, as a coded utterance representation signal of the first feature vector signal.

4. A speech recognition apparatus as claimed in claim 3, characterized in that the partial hypothesis comprises a series of words, and the partial hypothesis model comprises a series of word models, each word model representing a corresponding word in the partial hypothesis.

5. A speech recognition apparatus as claimed in claim 4, characterized in that each hypothesis score comprises an estimate of the probability of occurrence of each word in the hypothesis.

6. A speech recognition apparatus as claimed in claim 5, characterized in that the next context estimating means further comprises means for generating a next context score for each next context candidate word in the vocabulary of candidate words, each next context score comprising an estimate of the closeness of a match between a model of the next context candidate word and a portion of the sequence of coded representations of the utterance.

7. A speech recognition apparatus as claimed in claim 5, characterized in that the next context estimating means further comprises:
  means for identifying, for each speech hypothesis, a first portion of the sequence of coded representations of the utterance which is most likely to correspond to the speech hypothesis, and a second portion of the sequence of coded representations of the utterance which follows the first portion; and
  means for generating a next context score for each next context candidate word in the vocabulary of candidate words, each next context score comprising an estimate of the closeness of a match between a model of the next context candidate word and the second portion of the sequence of coded representations of the utterance.

8. A speech recognition apparatus as claimed in claim 5, characterized in that the next context estimating means estimates the probability of occurrence of the next context candidate word.

9. A speech recognition apparatus as claimed in claim 8, characterized in that the next context estimating means estimates the conditional probability of occurrence of the next context candidate word given the occurrence of at least one word in the speech hypothesis.

10. A speech recognition apparatus as claimed in claim 8, characterized in that the next context estimating means estimates the probability of occurrence of the next context candidate word independent of the speech hypothesis.

11. A speech recognition apparatus as claimed in claim 5, characterized in that the next context estimating means estimates, for each speech hypothesis in the initial subset, the most likely word, from the vocabulary of words, which is most likely to follow the speech hypothesis.

12. A speech recognition apparatus as claimed in claim 5, characterized in that the means for storing hypotheses, and the means for storing word models comprise electronic read/write memory.

13. A speech recognition apparatus as claimed in claim 5, characterized in that the measuring means comprises a microphone.

14. A speech recognition apparatus as claimed in claim 5, characterized in that the word output means comprises a video display.

15. A speech recognition apparatus as claimed in claim 14, characterized in that the video display comprises a cathode ray tube.

16. A speech recognition apparatus as claimed in claim 14, characterized in that the video display comprises a liquid crystal display.

17. A speech recognition apparatus as claimed in claim 14, characterized in that the video display comprises a printer.

18. A speech recognition apparatus as claimed in claim 5, characterized in that the word output means comprises an audio generator.

19. A speech recognition apparatus as claimed in claim 18, characterized in that the audio generator comprises a loudspeaker.

20. A speech recognition apparatus as claimed in claim 18, characterized in that the audio generator comprises a headphone.

21. A speech recognition method comprising:
  generating a set of two or more speech hypotheses, each speech hypothesis comprising a partial hypothesis of zero or more words followed by a candidate word selected from a vocabulary of candidate words;
  storing a set of word models, each word model representing one or more possible coded representations of an utterance of a word;
  generating an initial model of each speech hypothesis, each initial model comprising a model of the partial hypothesis followed by a model of the candidate word;
  generating a sequence of coded representations of an utterance to be recognized;
  generating an initial hypothesis score for each speech hypothesis, each initial hypothesis score comprising an estimate of the closeness of a match between the initial model of the speech hypothesis and the sequence of coded representations of the utterance;
  storing an initial subset of one or more speech hypotheses, from the set of speech hypotheses, having the best initial hypothesis scores;
  estimating, for each speech hypothesis in the initial subset, a likely word, from the vocabulary of words, which is likely to follow the speech hypothesis;
  generating a revised model of each speech hypothesis in the initial subset, each revised model comprising a model of the partial hypothesis followed by a revised model of the candidate word, the revised candidate word model being dependent at least on the word which is estimated to be likely to follow the speech hypothesis;
  generating a revised hypothesis score for each speech hypothesis in the initial subset, each revised hypothesis score comprising an estimate of the closeness of a match between the revised model of the speech hypothesis and the sequence of coded representations of the utterance;
  storing a reduced subset of one or more speech hypotheses, from the initial subset of speech hypotheses, having the best revised match scores; and
  outputting at least one word of one or more of the speech hypotheses in the reduced subset.

22. A speech recognition method as claimed in claim 21, characterized in that the revised model of each speech hypothesis in the initial subset does not include a model of the word which is estimated to be likely to follow the speech hypothesis.

23. A speech recognition method as claimed in claim 22, characterized in that the step of generating a sequence of coded representations of an utterance comprises:
  measuring the value of at least one feature of an utterance over each of a series of successive time intervals to produce a series of feature vector signals representing the feature values;
  storing a plurality of prototype vector signals, each prototype vector signal having at least one parameter value and having a unique identification value;

comparing the closeness of the feature value of a first feature vector signal to the parameter values of the prototype vector signals to obtain prototype match scores for the first feature vector signal and each prototype vector signal;

associating a first-rank score with the prototype vector signal having the best prototype match score, and for associating a second-rank score with the prototype vector signal having the second best prototype match score; and outputting at least the identification value and the rank score of the first-ranked prototype vector signal, and the identification value and the rank score of the second-ranked prototype vector signal, as a coded utterance representation signal of the first feature vector signal.

24. A speech recognition method as claimed in claim 23, characterized in that the partial hypothesis comprises a series of words, and the partial hypothesis model comprises a series of word models, each word model representing a corresponding word in the partial hypothesis.

25. A speech recognition method as claimed in claim 24, characterized in that each hypothesis score comprises an estimate of the probability of occurrence of each word in the hypothesis.

26. A speech recognition method as claimed in claim 25, characterized in that the step of estimating the word which is likely to follow the speech hypothesis comprises generating a next context score for each next context candidate word in the vocabulary of candidate words, each next context score comprising an estimate of the closeness of a match between a model of the next context candidate word and a portion of the sequence of coded representations of the utterance.

27. A speech recognition method as claimed in claim 25, characterized in that the step of estimating the word which is likely to follow the speech hypothesis comprises:

identifying, for each speech hypothesis, a first portion of the sequence of coded representations of the utterance which is most likely to correspond to the speech hypothesis, and a second portion of the sequence of coded representations of the utterance which follows the first portion; and generating a next context score for each next context candidate word in the vocabulary of candidate words, each next context score comprising an estimate of the closeness of a match between a model of the next context candidate word and the second portion of the sequence of coded representations of the utterance.

28. A speech recognition method as claimed in claim 25, characterized in that the step of estimating the word which is likely to follow the speech hypothesis comprises estimating the probability of occurrence of the next context candidate word.

29. A speech recognition apparatus as claimed in claim 28, characterized in that the step of estimating the word which is likely to follow the speech hypothesis comprises estimating the conditional probability of occurrence of the next context candidate word given the occurrence of at least one word in the speech hypothesis.

30. A speech recognition apparatus as claimed in claim 28, characterized in that the step of estimating the word which is likely to follow the speech hypothesis comprises estimating the probability of occurrence of the next context candidate word independent of the speech hypothesis.

31. A speech recognition apparatus as claimed in claim 25, characterized in that the step of estimating the word which is likely to follow the speech hypothesis comprises estimating the most likely word, from the vocabulary of words, which is most likely to follow the speech hypothesis.

* * * * *